United States Patent [19]

Soref

[11] Patent Number: 5,157,538

[45] Date of Patent: Oct. 20, 1992

[54] SILICON SPATIAL LIGHT MODULATOR

[75] Inventor: Richard A. Soref, Newton Centre, Mass.

[73] Assignee: The United States of America as represented by the Secretary of the Air Force, Washington, D.C.

[21] Appl. No.: 546,481

[22] Filed: Jun. 29, 1990

[51] Int. Cl.$^5$ .......................... G02F 1/01; H01L 29/12
[52] U.S. Cl. ..................... 359/245; 359/248; 359/259; 357/30; 357/58
[58] Field of Search ............... 350/354, 355, 356; 357/58, 59, 60, 30; 359/245, 246, 248, 259, 276

[56]  References Cited

U.S. PATENT DOCUMENTS

| | | | |
|---|---|---|---|
| 3,962,714 | 6/1976 | King | 350/355 |
| 4,571,559 | 2/1986 | Henry et al. | 357/58 |
| 4,588,260 | 5/1986 | Horner | 350/162.13 |
| 4,618,819 | 10/1986 | Mouron et al. | 324/77 K |
| 4,675,702 | 6/1987 | Gerber | 346/107 R |
| 4,693,561 | 9/1987 | Ashley | 350/336 |
| 4,698,602 | 10/1987 | Armitage | 350/356 |
| 4,705,361 | 11/1987 | Frazier et al. | 350/355 |
| 4,784,476 | 11/1988 | Schulman et al. | 350/355 |
| 4,790,635 | 12/1988 | Apsley | 350/356 |
| 5,051,803 | 9/1991 | Kitamura et al. | 357/58 |

FOREIGN PATENT DOCUMENTS 0673655 11/1963 Canada .......................... 357/58

OTHER PUBLICATIONS

"Electroluminescent Diodes and Array", J. C. Marinace et al. IBM Technical Disclosure Bulletin, vol. 8 No. 11, Apr. 1966.

Primary Examiner—Rolf Hille
Assistant Examiner—Tan Ho
Attorney, Agent, or Firm—Robert L. Nathans; Donald J. Singer

[57]  ABSTRACT

A crystalline silicon 1.1-20 micron spatial light modulator has an X-Y array of p-i-n pixels which are selectively foward biased at low voltages to induce substantial phase shifts in the optical wavefront, by the dual injection of holes and electrons through the silicon body and parallel to the light being modulated. The easy-to-fabricate SLM, is less sensitive to changes in temperature and wavelength, and can modulate light regardless of its state of polarization.

10 Claims, 4 Drawing Sheets

SILICON SPATIAL LIGHT MODULATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of spatial light modulators.

Prior art spatial light modulators are made from III-V semiconductors and require sophisticated, complex, expensive fabrication techniques such as multi-layer heteroepitaxy. Furthermore, they are quite wavelength and temperature sensitive as they must be operated near the bandgap wavelength. Accordingly, there is a need for a spatial light modulator (SLM) which can be fabricated from fewer materials in a simpler and thus less costly manner. There is also a need for an SLM which is less sensitive to changes in wavelength of light and temperature. There is also a need for an SLM which can modulate light inputted thereto regardless of its state of polarization.

BRIEF SUMMARY OF THE INVENTION

These needs are met by providing an SLM having a body of crystalline silicon which is doped in a manner to produce a two dimensional array of forward biased, dual injection p-i-n diode picture elements, hereinafter called DPEs. The SLM operates over a 1.3-20 micron wavelength range, in a transmission or reflection mode. Each picture or pixel element may be selectively forward biased to produce an "on" state and zero biased to produce an "off" state.

Other objects, features and advantages of the invention will become apparent upon study of the following description taken in conjunction with the drawings in which.

DETAILED DESCRIPTION OF PREFERRED EMBODIMENTS OF THE INVENTION

Figure 1:
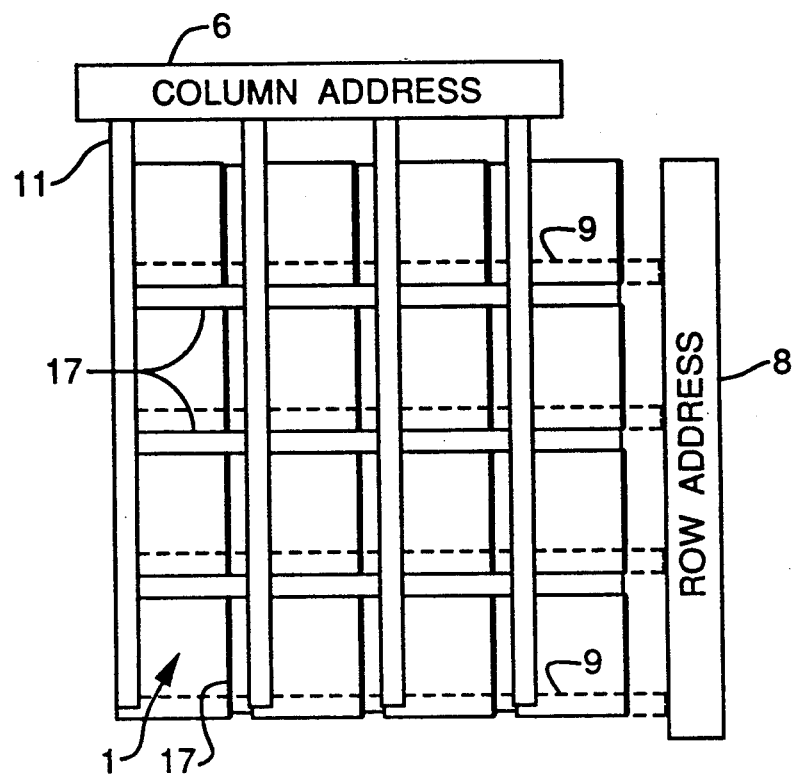
FIG. 1 illustrates a front view of a presently preferred embodiment of the invention.

Each diode pixel element (DPE) 1, has a crystalline Silicon body 3 having a central longitudinal axis 5, along which coherent collimated or quasi-collimated light 7 produced by light source 8 is propagated. Terminal DPE portions are doped in a manner to be described, to produce an anode 13 and a cathode 15.

Metallic strips 11 form column conductors making ohmic contact with cathodes 15, and metallic strips 9 form row conductors for making ohmic contact with anodes 13. Conventional X-Y array address electronic circuitry 6 and 8 is used to address each DPE row-at-a-time or in sequence, and to apply forward biasing potentials across selected pixels to change the states of the DPE's.

Figure 2:
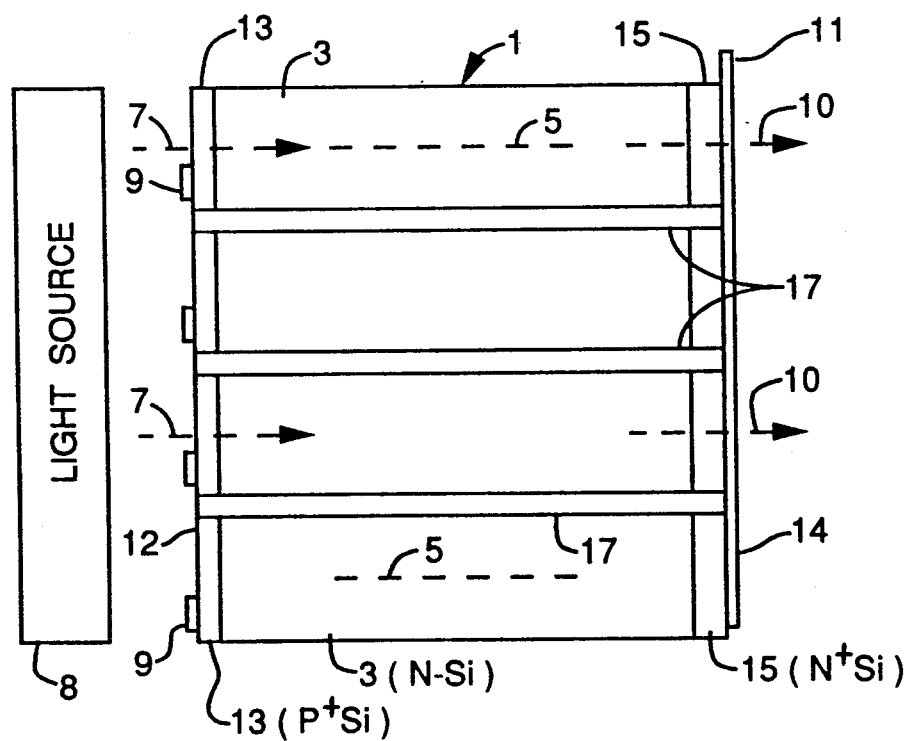
FIG. 2 illustrates a side view of such embodiment.

In the transmission mode, light having a wavelength of between 1.1-20 microns, enters the device and passes through the anodes 13, the body 3, and emerges from the cathodes 15 as indicated at 10. The light should be substantially perpendicular to the major faces 12 and 14 of the SLM and thus is parallel to axes 5. Since each DPE has a large depth-to-width ratio as shown in FIG. 2, light that is not substantially parallel to axes 5 would produce an undesirable "shadowing" effect.

Silicon body 3 has an anode portion 13 which is p+ doped to a depth of about two to three microns, and a cathode portion 15 which is n+ doped to a depth of two to three microns. Thus the anode and cathode portions are optically "thin" and thereby transparent. Despite the heavy contact doping of the anode and cathode, less than one DB of optical attenuation takes place. The unintentional residual or background doping of Si body 3 denoted as no-po, is chosen to be large enough for high carrier injection, and yet small enough to minimize free-carrier optical absorbtion loss at zero voltage bias; no-po is the concentration of residual donor impurities, minus the concentration of residual acceptor impurities. This residual doping of body 3 will be typically in the range of $10^{16}$ to $10^{17}$ donors-minus-acceptors per $cm^3$. The impurity density of the doped anode and cathode is about $10^{19}$ carriers per cubic cm, to provide good electrical properties, including high conduction, and optical transparency. Since the body 3 could be either n-type or p-type, the diodes could be either $p+-n-n+$ or $n+-p-p+$. The cathodes and anodes fill the entire terminal DPE portions 2 shown in FIG. 1.

Since both holes and carriers are injected along the length of axes 5, in this dual injection mode, the change in the index of refraction $\Delta n$ is doubled, relative to the injection of electrons or holes only. The resulting free-carrier plasma dispersion effect in the SLM is highly beneficial as will be explained hereinafter.

Also, the longitudinal current flow along axis 5 minimizes the required current density J through each DPE. This current would be ten-100 times greater if the current flow would be transverse to the direction of light propagation along the DPE axis. The picture elements are closely packed, yet isolated from each other by smooth vertical walls comprising dielectric material which "glues" all DPEs together mechanically. These walls, extending along the length of each DPE, will assure complete electrical and optical isolation of each DPE from its neighboring DPEs. They also serve to "passivate" the p/n junction and will assure low leakage currents. The walls 17, coating the sides of the DPEs, shown in FIGS. 1 and 2, can be made of $SiO_2$ or an organic polymer such as polyimid. An important feature of this wall-cylinder construction is that the injection current is completely confined within a forward biased addressed DPE, and thus current does not fringe into neighboring DPEs, even though the DPEs have a large "aspect ratio".

It is also desirable to keep the size of the metallic row-column addressing strips 9 and 11 small, so as not to block or obscure the light travelling through the DPEs. They should thus occupy non-centralized areas of the DPEs, along the corners or the edges thereof adjacent walls 17. The anodes could be individually contacted with an N×N array of silicon driving transistors that are fabricated within a Si wafer. The wafer would have its back face optically polished as well as its front face, so that it is an optically transparent drive circuit wafer. Each transistor would be positioned in a corner of each DPE area so as not to obscure much light. The transistors and metallizations should not obscure more than twenty percent or less of the light. If the array were operated in reflection, then it would be desirable to make the rear metallizations fill ninety percent of the DPE area since they could act as optical mirrors for the pixel elements.

Non-equilibrium carriers in Si produce $\Delta n + i\Delta k$, where $\Delta n$ is the real index change and $\Delta k$ is the change in optical extinction coefficient. The change in optical absorbtion $\Delta \alpha$ is given by $2\pi \Delta K/\lambda$. Thus we obtain combined amplitude and phase modulation, which is acceptable in a phase dominant SLM. See Horner, J. and Soref, R.; Electronics Letters, 1988, vol. 24, pp. 626-628. The pixel depth needed for 180 degree phase modulation, a useful modulation, is given by $L(\pi)$. Using the Drude model where Dn increases as $\lambda^2$, we find that $L_\pi$ in microns = 2817/$\lambda$ for $\Delta N_{eh} = 10^{17}$ carriers/cm$^3$, with $\lambda$ in microns.

$L_\pi$ in microns = 345/$\lambda$ for $\Delta N_{eh} = 10^{18}$ carriers/cm$^3$, with $\lambda$ in microns.

The Drude theory also shows that $\Delta \alpha$ increases as $\lambda^2$. Using this, we can estimate the depth L that is required for significant intensity modulation (IM) at long wavelengths. Let IM(dB) refer to the optical on/off intensity modulation of each pixel in dB. In that case, we find that IM(dB) = $1.8 \times 10^{-4} \lambda^2 L$ for $\Delta N_{eh} = 10^{17}$ cm$^{-3}$ with $\lambda$ and L in microns.

IM(dB) = $2.8 \times 10^{-4} \lambda^2 L$ for $\Delta N_{ah} = 10^{17}$ cm$^{-3}$ with $\lambda$ and L in microns.

Figure 3:
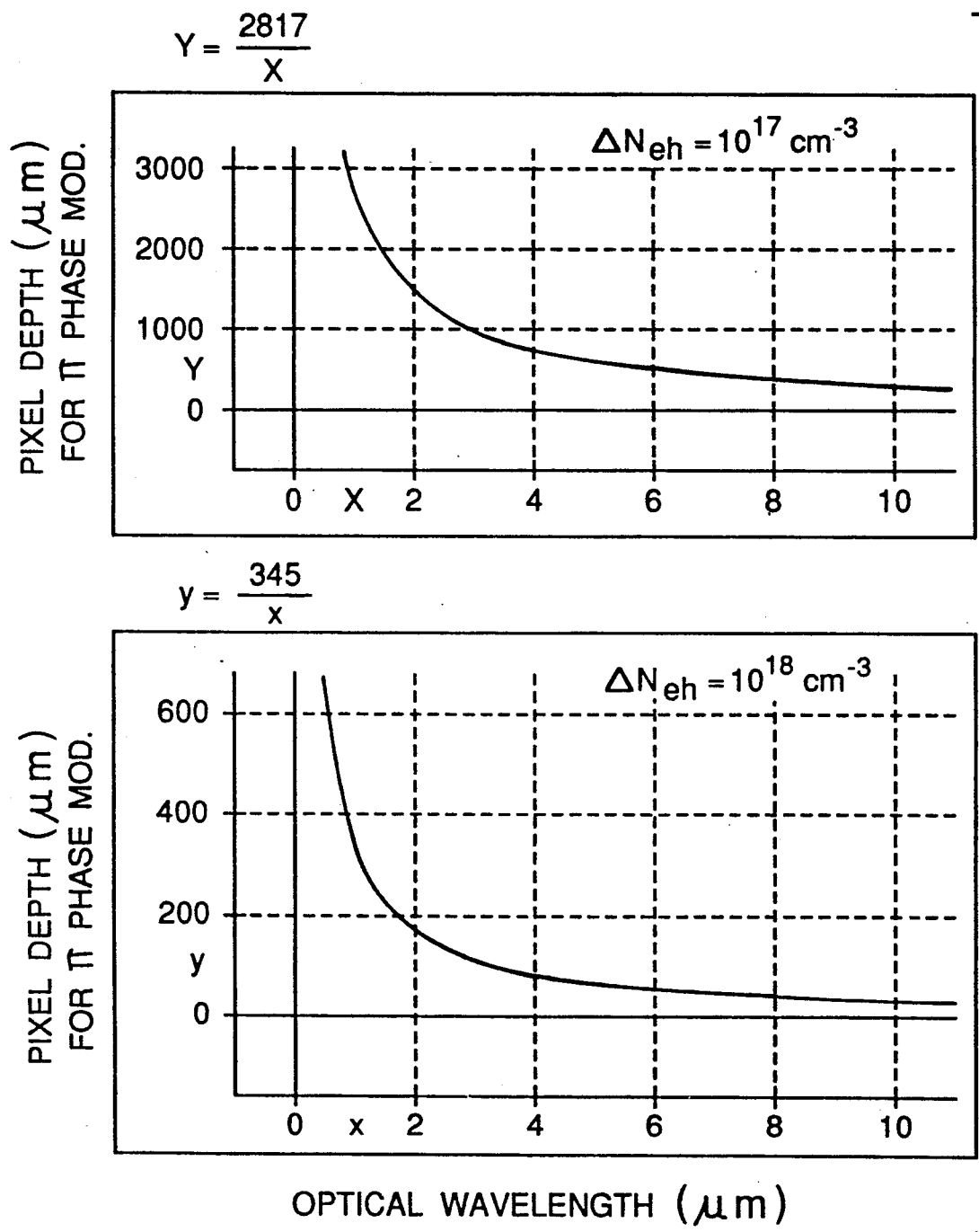
FIGS. 3-6 illustrate the relationship between various operating parameters in graphic form.
Figure 4:
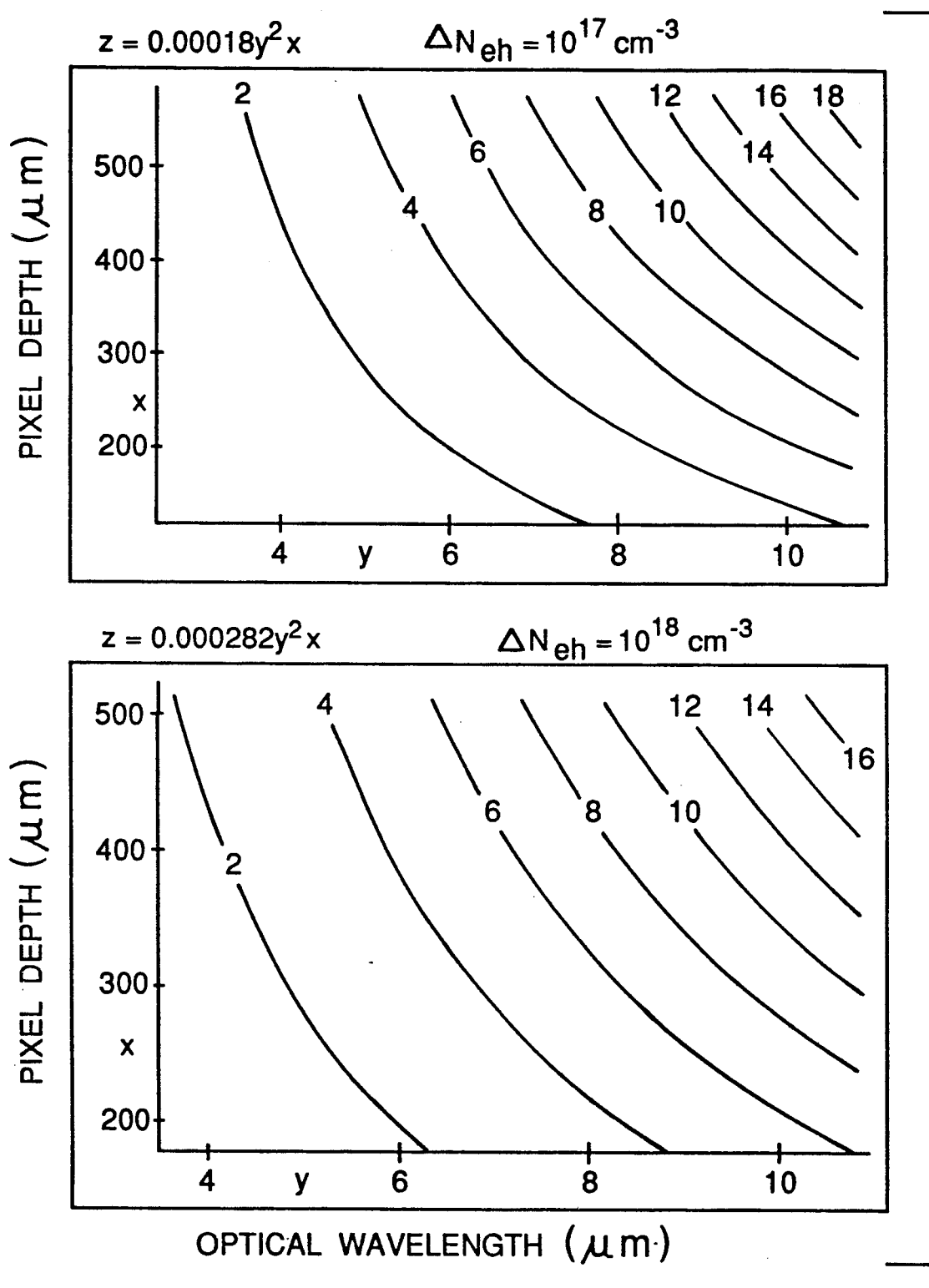

The results are plotted in FIGS. 3 and 4 as a function of optical wavelength, where FIG. 4 shows contours of constant intensity modulation for a given interaction length on the vertical scale. From FIG. 3 we conclude that $L_\pi$ is a sensitive function of $\Delta N_{eh}$ in the 1.3 to 2 micron region, and that $\Delta N_{eh} \sim 10^{18}$/cm$^3$ needed to keep the pixel depth below 400 microns in this wavelength range. From FIG. 4, we conclude that we can get only 3 dB of intensity modulation in the 3-5 micron atmospheric window at high injection ($\Delta N_{eh} = 10^{18}$/cm$^3$) with a pixel depth of 400 microns. If however, we operate at the longer wave region of 8-14 microns, then it is easy to attain strong intensity modulation of 10-15 dB with pixel depths of 400-500 microns at moderate and high injection. We now turn to the theory of double injection diodes (Friedman, Soref, Lorenzo, J. of Applied Physics, vol. 63, Mar. 15, 1988, pp. 1831-1839, equations 12 and 13) in order to estimate the current density J, the required drive voltage V, the background doping of the diode, the drive current I per pixel and the injected carrier density $\Delta N_{eh}$. Generally, we would use a background doping $M_c$-$P_o$ in the range $10^{16}$-$10^{17}$/cm$^3$, for optical transparency. If we specifically select $M_o$-$P_o = 4 \times 10^{16}$, we find from Ref 2 in the Applied Physics publication, that $J = 2.36 \times 10^9 V^{1.5} L^{-2}$ with L in $\mu$m and J in A/cm$^2$
$\Delta N_{eh} = 8.76 \times 10^{20} V^{20} V^{0.5} L^{-1}$ with L in $\mu$m and $\Delta N_{eh}$ in cm$^{-3}$.

Figure 5:
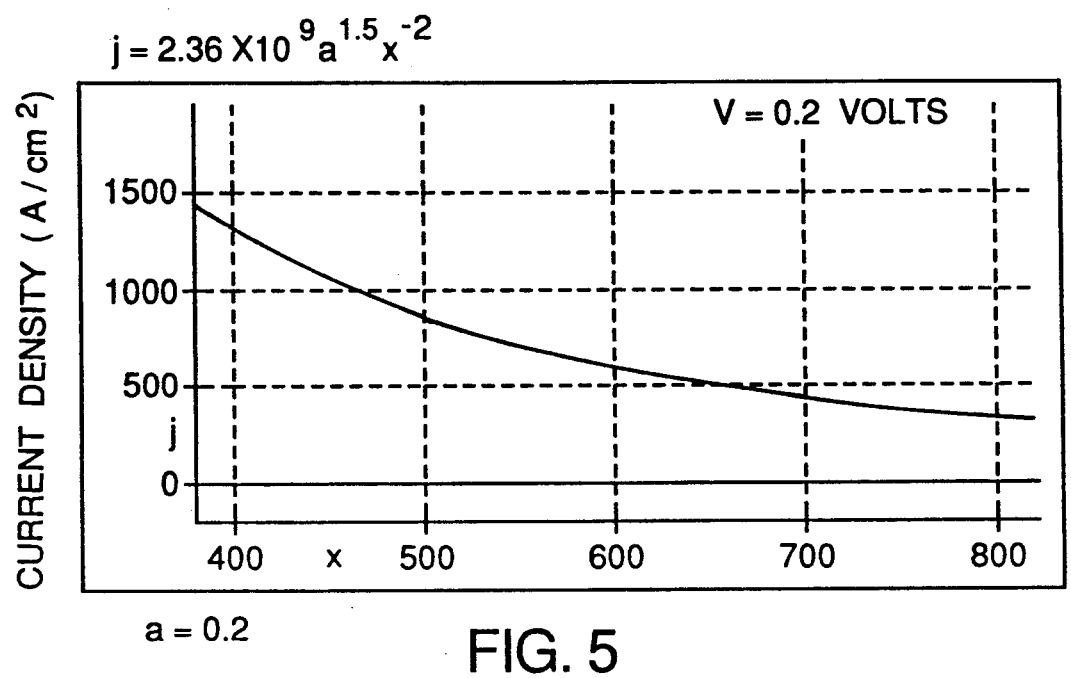
Figure 6:
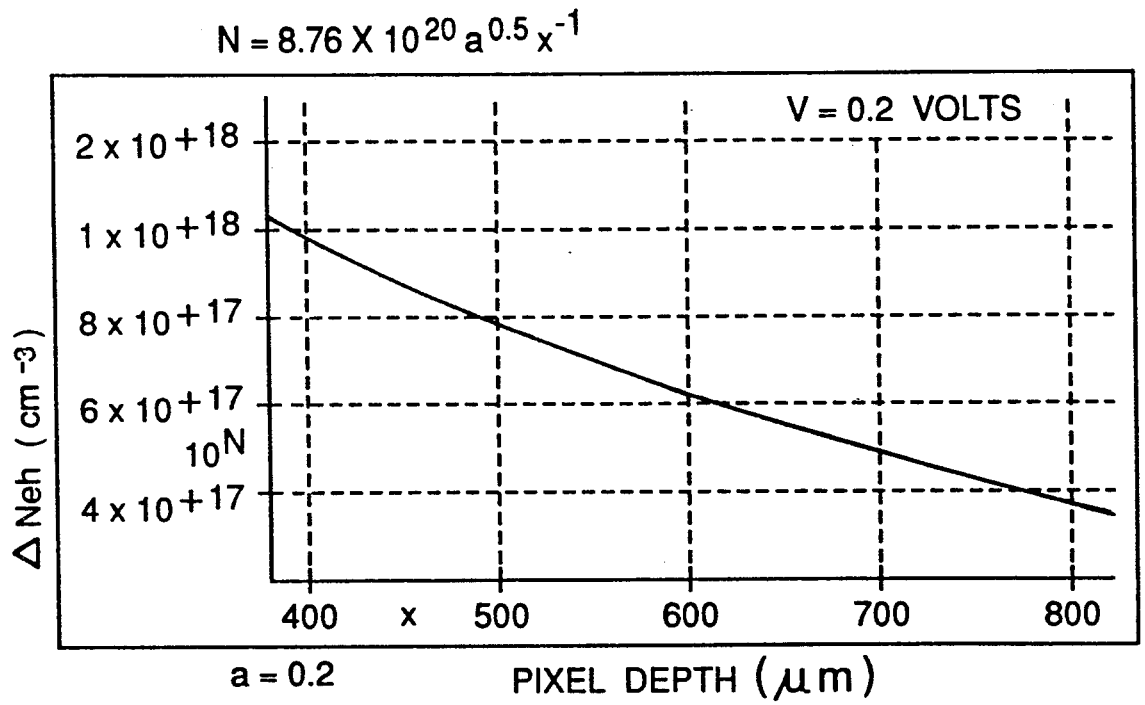

These relations hold for any wavelength The results for both quantities are plotted as a function of pixel depth in FIGS. 5 and 6, for V = 0.2 volts. We find that we can keep J below 1000 A/cm$^2$ by choosing L to be greater than 450 microns at V = 0.2 volts. Also for L = 450 microns, the hole and electron injection is $9 \times 10^{17}$ pairs per cubic cm at this voltage, which is a high number. The injection is $8 \times 10^{17}$ per cm$^3$ at L = 500 microns. The conclusion is that L = 500 microns is a good compromise number in the various wavelength ranges discussed above at 0.2 volts.

The typical pixel area is about $50 \times 50$ microns. Hence the depth-to-width aspect ratio is about 10:1. This might create a few optical problems and the pixels could be somewhat difficult to construct. It is difficult to increase the SLM resolution to very high values by shrinking the pixel area down to $10 \times 10$ microns because that would increase the aspect ratio to 50:1 which would intensify the optical and construction problems. However, the optical problem can be alleviated by positioning a 2-D array of fly's eye lenslets at the SLM input and a similar lenslet array at the SLM output. Another drawback is the relatively high J required per pixel. For example, the current for each pixel, having an area a, (I = Ja) is 25 mA in the J = 1000 A/cm$^2$ limit. The J and I requirements could present a problem for the pixel drivers and for heat dissipation in the SLM, and thus cooling may be required.

While preferred embodiments have been described, other embodiments will occur to the worker in the art and thus the scope of the invention is to be limited only by the language of the following claims and art recognized equivalents.

I claim:

1. A spatial light modulator (SLM) for modulating light having a wavelength of between 1.1-20 microns comprising:
   (a) a body of crystalline silicon having a major front surface and a major back surface;
   (b) a spatial array of dual injection p-i-n pixel elements (DPEs) formed within said body, each pixel element having a longitudinal axis, and each pixel element having a p portion, an i portion and an n portion positioned along the longitudinal axis of each DPE, and wherein each longitudinal axis of each pixel element is perpendicular with respect to said major front surface and said major back surface of said body.

2. The SLM of claim 1 further including biasing means for forward biasing selected ones of said DPEs for in turn injecting sufficient electron-and-hole current flow therethrough to produce substantial refractive-index changes.

3. The SLM of claim 2 wherein said DPEs have a longitudinal axis and said biasing means is oriented to direct said current flow parallel to said longitudinal axes, thereby reducing the current density.

4. The SLM of claim 3 including a source of coherent light having a wavelength of between 1.1-20 microns, for directing said light through said SLM in a direction parallel to the longitudinal axes of said DPEs.

5. The SLM of claim 1, 2, 3, or 4 wherein each of said DPEs is coated on its sides with dielectric insulating material to confine current flow within each DPE, minimizing electrical and optical crosstalk between said DPEs, and minimizing p-n junction leakage.

6. The SLM of claim 1, 2, 3, or 4 wherein the depth of said DPEs along said longitudinal axes is between 450-500 microns.

7. The SLM of claim 1, 2, 3, or 4 wherein said body of crystalline silicon has a residual doping of $10^{16}$ to $10^{17}$ donors-minus-acceptors per cubic centimeter, thereby providing optical transparency at zero bias of said DPEs and facilitating low-voltage drive thereof with moderate current densities.

8. The SLM of claim 2, 3, or 4 wherein said biasing means applies a forward addressing voltage of 0.2 to 0.3 volts to said DPEs to limit the current density to less than about 1000 A per centimeter squared.

9. The SLM of claim 1, 2, 3, or 4 wherein the p-i-n pixel elements include p+ anodes and n+ cathodes doped to a depth of 2-3 microns with an impurity density of about $10^{19}$ per cubic centimeter.

10. The SLM of claim 2, 3, or 4 wherein said biasing means include ohmic contact members confined to minor non-centralized portions of terminal pixel portions of said DPEs.

* * * * *